United States Patent Office 3,232,987
Patented Feb. 1, 1966

3,232,987
N-ALKYL-N-FORMYL-2-HALO-2-ALKYL ACETAMIDES
Karl Lutz, Basel, and Max Schuler, Arlesheim, Switzerland, assignors to Sandoz Ltd. (a/k/a Sandoz A.G.), Basel, Switzerland
No Drawing. Original application July 14, 1960, Ser. No. 42,751, now Patent No. 3,176,035, dated Mar. 30, 1965. Divided and this application Sept. 28, 1964, Ser. No. 405,642
Claims priority, application Switzerland, July 17, 1959, 75,881
6 Claims. (Cl. 260—561)

The present application is a division of copending application, Serial No. 42,751, filed July 14, 1960.

The present invention is concerned with novel intermediates for the preparation of new insecticidal and acaricidal monothiophosphoric and dithiophosphoric acid esters.

The aforesaid new monothiophosphoric and dithiophosphoric acid esters correspond to the formula $$\begin{matrix} R_1O & Y & R_4 & O & R_3 \\ \diagdown \| & | & \| & | \\ PS-CH-C-N-CHO \\ \diagup \\ R_2O \end{matrix} \quad (I)$$

wherein each of $R_1$ and $R_2$ represents $CH_3$ or $C_2H_5$, $R_3$ stands for methyl, ethyl or propyl, $R_4$ stands for H, methyl, ethyl or propyl, and Y stands for an oxygen atom or a sulfur atom.

Compounds I can advantageously be prepared by reacting a compound of the formula $$\begin{matrix} R_4 & O & R_3 \\ | & \| & | \\ X-CH-C-N-CHO \end{matrix} \quad (II)$$

wherein $R_3$ and $R_4$ have the precedingly-recited significances and X stands for halogen with a compound of the formula $$\begin{matrix} R_1O & Y \\ \diagdown \| \\ PS-Z \\ \diagup \\ R_2O \end{matrix} \quad (III)$$

wherein Y is as precedingly recited and Z is a cation. Where Z is H, the reaction is carried out in the presence of an acid-binding agent.

The reaction is advantageously carried out in a solvent such as acetone, methylethylketone, dioxane or water or in an aliphatic or aromatic hydrocarbon or in a mixture of such solvents, at normal or slightly raised temperature.

Suitable compounds of Formula II are for example the chloroacetyl-N-alkyl-formamides such as chloroacetyl-N-methyl-formamide, chloroacetyl-N-ethyl-formamide, chloroacetyl-N-isopropyl-formamide, as well as α-chloropropionyl-N-methyl-formamide; also the corresponding bromo-compounds. These intermediates are themselves new compounds and the claims of the present application are directed exclusively thereto.

Suitable compounds of Formula III are for example:

$$\begin{matrix} CH_3O & S \\ \diagdown \| \\ PS-H \\ \diagup \\ CH_3O \end{matrix} \qquad \begin{matrix} C_2H_5O & S \\ \diagdown \| \\ PS-H \\ \diagup \\ C_2H_5O \end{matrix}$$

$$\begin{matrix} CH_3O & S \\ \diagdown \| \\ PS-K \\ \diagup \\ CH_3O \end{matrix} \qquad \begin{matrix} C_2H_5O & S \\ \diagdown \| \\ PS-Na \\ \diagup \\ C_2H_5O \end{matrix}$$

$$\begin{matrix} CH_3O & S \\ \diagdown \| \\ PS-NH_4 \\ \diagup \\ CH_3O \end{matrix} \qquad \begin{matrix} C_2H_5O & O \\ \diagdown \| \\ PS-Na \\ \diagup \\ C_2H_5O \end{matrix}$$

etc.

The monothiophosphoric and dithiophosphoric acid esters I are liquid at room temperature (about 20° to about 30° C.). They are generally soluble in oils as well as in organic solvents, and are easily emulsifiable in water. The new esters I are outstandingly suitable for combating pests, more especially insects and spider mites (Tetranychidae sp.), in the protection of plants. Some of the compounds I are distinguished by excellent systemic action.

As will hereinafter appear, the new compounds I are distinguished from known systemically acting insecticides by reduced toxicity to warm-blooded animals, while having as good or better systemic action.

(1) ORAL TOXICITY OF ACTIVE SUBSTANCES

| No. | Formula of active ingredient of composition— | LD$_{50}$ (mg./kg.) | |
|---|---|---|---|
| | | White mouse | Rat |
| 1 | $(CH_3O)_2PSSCH_2CONHCH_3$ | 130 | |
| 2 | $(CH_3O)_2PSSC_2H_4SC_2H_5$ | 105 | 120 |
| 3 | $(CH_3O)_2P(O)SC_2H_4SC_2H_5$ | | 40 |
| 4 | $(CH_3O)_2P(S)OC_2H_4SC_2H_5$ (technical mixture of the thiono and thiolo forms). | | 64 |
| 5 | $(CH_3O)_2PSSCH_2CO-N-CH_3$<br>                       $\|$<br>                      CHO | 210 | |

(NOTE.—Compositions 1 to 4 are commercial preparations available on the market; composition 5 is according to Example 1 of the present application.)

(2) SYSTEMIC ACTION

Potted spiderwort plants are each "watered" with 100 milliliters of an aqueous emulsion of the insecticide being tested in such manner that the emulsion comes in contact only with the root system of the plants.

On the next day, each plant has applied thereto 30 grasshoppers (*Carausius morosus*) in the 2nd larval stage. The systemic-insecticidal action of the various insecticides is checked daily by counting the number of dead insects.

The observed results are characterized by indication of the mortality (in percent of the applied insects) after $x$ days after the treatment (percent/$x$):

| Formula of Insecticide | Mg. of active substance per liter of emulsion | Systemic Action |
|---|---|---|
| $(CH_3O)_2PSSCH_2CONHCH_3$ | 100<br>50 | 90%/6; 100%/8<br>63%/6; 100%/8 |
| $(CH_3O)_2PSSC_2H_4SC_2H_5$ | 100<br>50 | 100%/6<br>96%/6; 100%/8 |
| $(CH_3O)_2P(O)SC_2H_4SC_2H_5$ | 100<br>50 | 100%/6<br>63%/6; 100%/8 |
| $(CH_3O)_2P(S)OC_2H_4SC_2H_5$ (technical mixture of the thiono and thiolo forms). | 100 | 90%/6; 96%/8<br>100%/10 |
| $(CH_3O)_2PSSCH_2CO-N-CH_3$<br>                     $\|$<br>                    CHO | 100<br>50 | 100%/6<br>73%/6; 100%/8 |

In combating pests by means of the new monothiophosphoric and diethiophosphoric acid esters of Formula I, the latter are advanageously admixed with emulsifying agents, for example with liquid polyglycol ethers obtained from higher alcohols, mercaptans or alkylphenols by adding on ethylene oxide, then emulsifying the mixture in water, and applying the emulsion by spraying thereof onto the surfaces to be treated. Solution aids, such as suitable organic solvents, for example mono- or poly-alcohols, ketones, aromatic hydrocarbons, mineral oils, etc., may be incorporated into the mixtures of ester I and emulsifying agents. In order to produce water-suspendible pulverulent products, there may also be incorporated into the said mixtures, solid carriers such as talc, kaolin, kieselguhr, bentonite, etc. The liquid or pulverulent products are emulsified or dispersed in water before being used, it being preferable that the resultant emulsions or dispersions should contain 0.005 to 0.2% by weight of ester I.

However, the new monothiophosphoric and diethiophosphoric acid esters I can also be used without emulsifiers, in which event the esters are advantageously admixed with adhesion promoting agents and inert carriers, such as talc, kaolin, kieselguhr, bentonite, etc., or with a mixture of such carriers, so that the product may be used as a dusting composition or scattering composition.

The following examples set forth presently preferred exemplary embodiments of the invention. Parts and percentages are by weight unless otherwise indicated. The relationship of parts by weight to parts by volume is the same as that between grams and milliliters. Temperatures are in degrees centrigrade.

*A. Examples of the preparation of the intermediates of the formula*

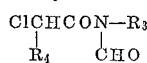
ClCHCON—R₃
　|　　　|
　R₄　　CHO

The general method for the preparation of the intermediates of the preceding formula is as follows:

1 mol of an α-chlorocarboxylic acid chloride of the formula

R₄—CHCl—COCl is dissolved in trichloroethylene, after which 1 mol of formamide of the formula

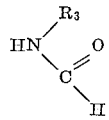

is stirred in dropwise at about 80° in the course of 1 to 2 hours. Stirring of the reaction mixture is then further continued at the said temperature until hydrogen chloride development has practically ceased.

EXAMPLE 1

59 parts (=1 mol) of the compound of the formula

CH₃NHCHO are dissolved in 100 parts by volume of trichloroethylene and the resultant solution is stirred dropwise in the course of 1 to 2 hours into a solution, heated to 80°, of 112 parts (=1 mol) of chloroacetic acid chloride in 200 parts by volume of trichloroethylene. Stirring is then continued from about one more hour at 80°. The resultant reaction product of the formula ClCH₂CON—CH₃
　　　　|
　　　　CHO is recovered from the reaction mixture by distillation. Yield: 85%. Boiling points: 70–71°/0.4 mm., $n_D^{20}=1.4960$ Cl calc.: 26.2%. Found: 26.5%.

EXAMPLE 2

The procedure according to Example 1 is repeated, using—as starting materials—chloroacetic acid chloride and the formamide of the formula

C₂H₅NHCHO

The obtained intermediate of the formula

ClCH₂CON—C₂H₅
　　　　|
　　　　CHO has a boiling point of 69–70°/0.4 mm., $n_D^{20}=1.4840$. Cl calc.: 23.7%. Found: 24.2%.

EXAMPLE 3

In analogous manner, from chloroacetic acid chloride and the formamide of the formula iso-C₃H₇NHCHO there is obtained the intermediate of the formula ClCH₂CON—C₃H₇—iso
　　　　|
　　　　CHO which has a boiling point of 61–63/0.3 mm., $n_D^{20}=1.4482$. Cl calc.: 21.7%. Found: 21.1%.

EXAMPLE 4

In similar manner, from chloroacetic acid chloride and the formamide of the formula n-C₃H₇NHCO there is obtained the intermediate of the formula ClCH₂CON—C₃H₇—n
　　　　|
　　　　CHO Boiling point: 79–82°/0.7 mm., $n_D^{20}=1.4702$.

EXAMPLE 5

In analogous manner, from α-chloropropionic acid chloride

CH₃CHClCOCl and the formamide of the formula

CH₃NHCHO there is obtained the intermediate of the formula

CH₃CHClCON—CH₃
　　　　　|
　　　　　CHO which boils at 64–67°/0.5 mm., $n_D^{20}=1.4812$. Cl calc.: 23.7%. Found: 23.3%. N calc.: 9.36%. Found: 9.46%.

*B. Examples of the preparation and use of the end products of the formula*

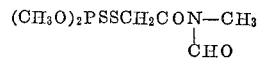
R₁O　Y　　R₄　CHO
　\\ ||　　|　　|
　　P—S—CHCON—R₃
　/
R₂O

EXAMPLE 6

68 parts of the compound of the formula

ClCH₂CON—CH₃
　　　　|
　　　　CHO and 90 parts of the compound of the formula (CH₃O)₂PSSNH₄ are stirred together for 4 hours in 300 parts by volume of chloroform at about 55°. The chloroform layer is then washed successively with water, 5% aqueous sodium bicarbonate solution and again with water. After drying the chloroform layer and distilling off the chloroform, there is obtained in an about 85% yield the compound of the formula (CH₃O)₂PSSCH₂CON—CH₃
　　　　　　　　|
　　　　　　　　CHO in the form of a yellow oil. $n_D^{20}=1.5522$. P calc.: 12.0%. Found: 12.1%. S calc.: 24.9%. Found: 25.4%.

EXAMPLE 7

30 parts of the compound of the formula

ClCH₂CON—C₂H₅
　　　　|
　　　　CHO and 37 parts of the compound of the formula (CH₃O)₂PSSNH₄ are stirred together for 2 hours in 150 parts by volume of acetone at 50°. After the addition of 600 parts by volume of water, the organic layer is extracted with chloroform, the chloroform extract washed successively with water, 5% aqueous sodium bicarbonate solution and again with water, and then dried. After distilling off the chloroform, there remains as residue in an about 85% yield the compound of the formula

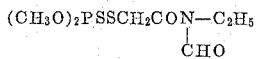

in the form of a yellow oil. $n_D^{20}=1.5384$. P calc.: 11.4%. Found: 11.6%. S calc.: 23.6%. Found: 24.4%.

EXAMPLE 8

33 parts of the compound of the formula

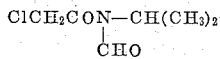

and 37 parts of the compound of the formula

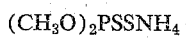

are stirred together for 4 hours in 200 parts by volume of dioxane at 60°. After addition of 1000 parts of volume of water, the organic layer is extracted with chloroform. After drying the chloroform extract and distilling off the chloroform, there is obtained in an about 80% yield the compound of the formula

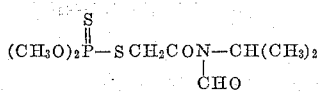

in the form of a yellow-brown oil. $n_D^{20}=1.5286$. P calc.: 10.9%. Found: 11.2%.

EXAMPLE 9

27 parts of the compound of the formula

and 40 parts of the compound of the formula

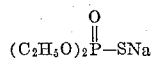

are stirred together for 2 hours in 200 parts by volume of acetone at 50°. The acetone solution is then cooled and separated from precipitated NaCl by filtration. The acetone is distilled from the filtrate, the residue taken up in ether, the ether solution washed with water and dried over sodium sulfate.

After distilling off the ether, there remains as residue in practically quentitative yield the compound of the formula

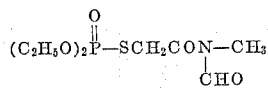

$n_D^{20}=1.4928$. P calc.: 11.5%. Found: 11.2%. S calc.: 11.9%. Found: 11.7%.

EXAMPLE 10

41 parts of the compound of the formula

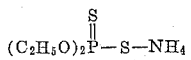

and 50 parts of the compound of the formula

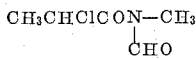

are stirred together for 2 hours in 200 parts by volume of acetone at 50°. After the addition of 1000 parts by volume of water, the organic layer is extracted with chloroform. After drying the extract and distilling off the chloroform, there is obtained in an about 75% yield the compound of the formula

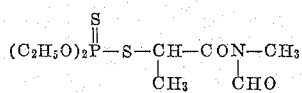

in the form of a yellowish oil. $n_T^{20}=1.5257$. N calc.: 4.7%. Found: 4.9%. P calc.: 10.4%. Found: 10.9%. S calc.: 21.9%. Found: 21.8%.

EXAMPLE 11

In analogous manner (to that of Example 10), there is obtained from the compound of the formula

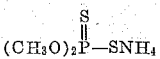

and the compound of the formula

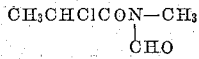

the compound of the formula

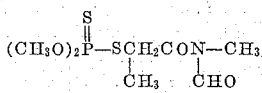

in the form of a brownish-yellow oil. $n_D^{20}=1.5314$. P calc.: 11.4%. Found: 12.1%. S calc.: 23.6%. Found: 24.7%.

EXAMPLE 12

50 parts of the ester of the formula

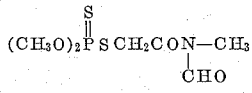

are admixed with 50 parts of isooctylphenylheptaglycolether, a clear solution being obtained. An aqueous emulsion of this solution, which emulsion contains 0.02% of the ester, is sprayed on young apple trees infested with aphis. In a few hours, all aphis have been killed.

EXAMPLE 13

20 parts of the ester of the formula

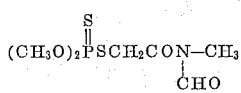

are admixed with 30 parts of isooctylphenyloctaglycolether and with 50 parts of a petroleum fraction which boils at 210–280°, specific gravity (20°) 0.92, a clear solution being obtained which is well emulsifiable in water. Such an emulsion, containing 0.05 to 0.1% of the said ester, effects a 100% kill on all stages of spider mites, e.g. *Tetranychus telarius, Paratetranychus pilosus*, etc.

EXAMPLE 14

20 parts of the ester of the formula

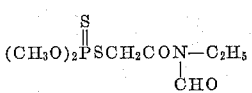

are admixed with 20 parts of laurylhexaglycolether and 60 parts of xylene, the resultant product being readily water-emulsifiable. An aqueous emulsion of this product, which emulsion contains 0.2% of the ester, is sprayed on aphis-infested potted plants (cineraria, aster, chrysanthemum). In a short time, all aphis are dead.

EXAMPLE 15

(a) By admixing 25 parts of the ester of the formula

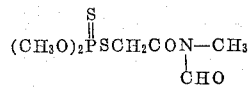

with 25 parts of diisohexyl-heptylphenylhexaglycolether, 25 parts of xylene and 25 parts of diethyleneglycol, a product is obtained which is well emulsifiable with water. Potted spiderwort plants of a height of about 20 cm. are each watered with 100 milliliters of an aqueous emulsion of the said product, such emulsion containing 0.02% of the active ester, care being taken that no green parts of the plant are wetted. The next day, 30 grasshopper larvae (*Carausius morosus*), second stage, are applied to each plant. The larvae feed on the leaves and in this way also include in their nourishment the aforesaid active ester which has been taken in by the roots of the plants and transported to the leaves. At the end of 8 days, no living larvae remain; all are dead.

(b) An aqueous emulsion of the same product, containing 0.2% of active ester, is sprayed on aphis-infected plants of *Erigeron canadense*, in such manner that only the bottom part of the plants (not roots) are contacted, while the upper part of the plants—where the aphis are—remains untreated. After two to three days, all aphis on the not-directly treated upper part are dead.

(c) Bean plants in the two-leaf stage and which are infested with *Aphis fabae* are sprayed with an aqueous emulsion of the same composition—0.02% of active ester—whereupon, in a few hours, all the aphis have been killed.

EXAMPLE 16

A pulverulent product of good suspendability in water is obtained by intimately admixing 15 parts of the ester of the formula

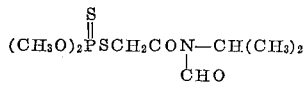

with 3 parts of tert. dodecylmercaptanundecaglycolether, 7 parts of powdered silica gel and 75 parts of kaolin. A suspension prepared from this mixture and containing 0.1% of the said ester, when sprayed on aphis, produces a complete kill in a few hours.

EXAMPLE 17

2 parts of the ester of the formula

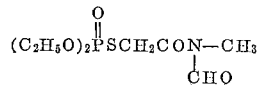

are admixed with 98 parts of talc, and the mixture ground in a ball mill. The product is a dusting agent which, dusted in areas infested by cockroaches (*Periplaneta americana*), effects a 100% kill in 24 to 48 hours of all of the latter which come into contact with the dust.

Having thus disclosed the invention what is claimed is:

1. A compound of the formula

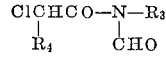

wherein $R_3$ is alkyl with at most three carbon atoms, and $R_4$ is $-C_nH_{2n+1}$ wherein $n$ is a numeral from 0 to 3 inclusive.

2. The compound of the formula

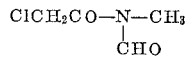

3. The compound of the formula

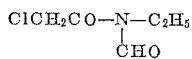

4. The compound of the formula

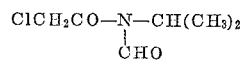

5. The compound of the formula

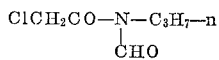

6. The compound of the formula

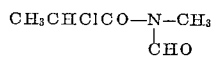

References Cited by the Examiner

Fieser et al.: Organic Chemistry, 2nd ed., pages 216–17, Boston, Heath, 1950.

Hamm et al.: Jour. Ag. and Food Chem., vol. 4, No. 6, pages 518–522 (1956).

Harries et al.: Berichte, vol. 43, pages 634–39 (1910).

Smirnova et al.: Chemical Abstracts, vol. 47, page 3233 (1953).

WALTER A. MODANCE, *Primary Examiner.*